Aug. 31, 1937.   N. O. PANZEGRAU   2,091,485
OIL AND DIRT SEAL
Filed Oct. 14, 1935   2 Sheets-Sheet 2

Inventor
Norman O. Panzegrau
By V. J. Lassagne
Atty.

Patented Aug. 31, 1937

2,091,485

UNITED STATES PATENT OFFICE 2,091,485

OIL AND DIRT SEAL

Norman O. Panzegrau, Chicago, Ill., assignor to International Harvester Company, a corporation of New Jersey Application October 14, 1935, Serial No. 44,877

12 Claims. (Cl. 286—7)

The invention relates to an improved oil and dirt seal designed for use around a shaft between a rotating part on the shaft and a stationary part supporting the shaft to retain the oil on the bearing surface of the shaft and to exclude dirt therefrom. Generally the seal may be utilized in any mechanical structure between relatively movable parts.

More particularly, however, the seal has been designed especially for use in track type tractors. In these machines the track rollers through which the weight of the tractor is transmitted to the ground stretch of the track are subjected to severe loads and when dirt gains access to the bearings of these rollers they quickly wear and cause break-down of the tractor. It is also important to keep the oil from leaking out from the bearing surfaces of these track rollers.

Accordingly, the primary object of the invention is to provide an improved seal for the purposes stated.

Another object is to provide a seal which can be mounted around a shaft in an annular labyrinth passage between relatively movable parts, the seal to embody features of construction for causing a sealing action in three directions positively to insure against ingress of dirt and dust and egress of oil.

A more specific object is to provide an improved seal for use with track rollers and like parts used in track type tractors.

Another object is to provide a self-contained seal structure easy to produce and assemble in place.

Other objects will become apparent to those skilled in this art as the disclosure is more fully made.

In the particular embodiment of the seal herein shown and described as one practicable form of the invention, there is provided a stationary shaft mounted in a stationary bracket. The shaft carries rotatably a roller such as a track roller, and an annular labyrinth passage surrounds the shaft between adjacent end faces of the roller and the bracket. The seal is located in this annular labyrinth passage and comprises generally a felt washer and a metal presser plate, or second washer, backed against the same. On the side of the presser plate opposite from the felt washer, there is located an annular channel-shaped diaphragm sealing element of leather or the like, sealing the shaft. The side of the channel contacting the shaft is pressed to duty against the shaft by an annular coil spring in a radial inward direction, whereas the side of the channel radially away from the shaft is pressed to duty in a direction outwardly against the wall of the annular passage in the bracket by an expansible metallic ring of the piston ring type. A channel-shaped retainer annularly surrounds the shaft in the labyrinth passage to retain the coil spring and piston ring in place. Springs are arranged within the retainer for yieldingly pressing the sealing parts axially of the mounting shaft in a direction toward and against the end face of the roller. So much will suffice for the present and will give a general understanding of the improved seal structure. In the accompanying sheets of drawings illustrating the improved seal construction:—

Figure 1:
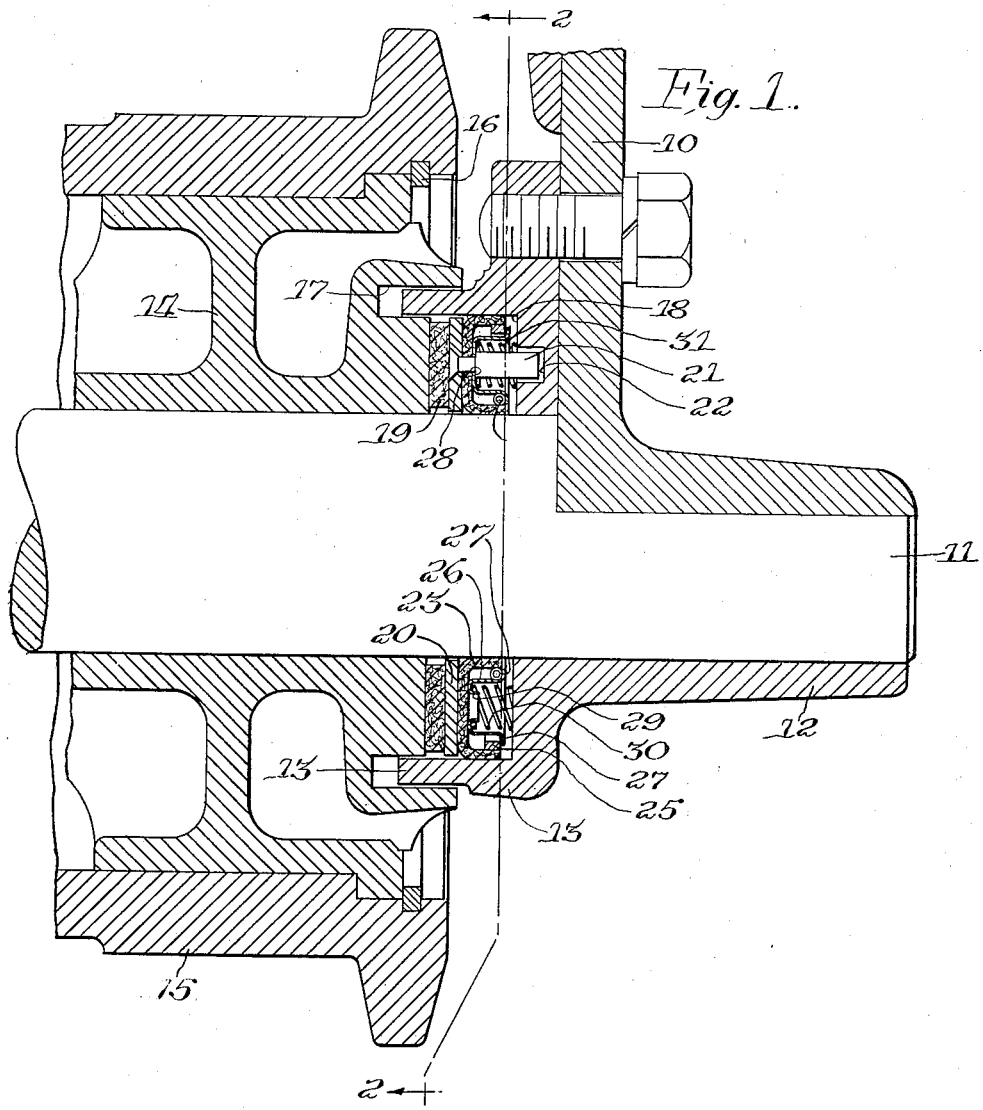
Figure 1 is a vertical cross sectional view through the assembly of a track roller with its mounting and the seal taken along the line 1—1 of Figure 2, looking in the direction indicated by the arrows.
Figure 2:
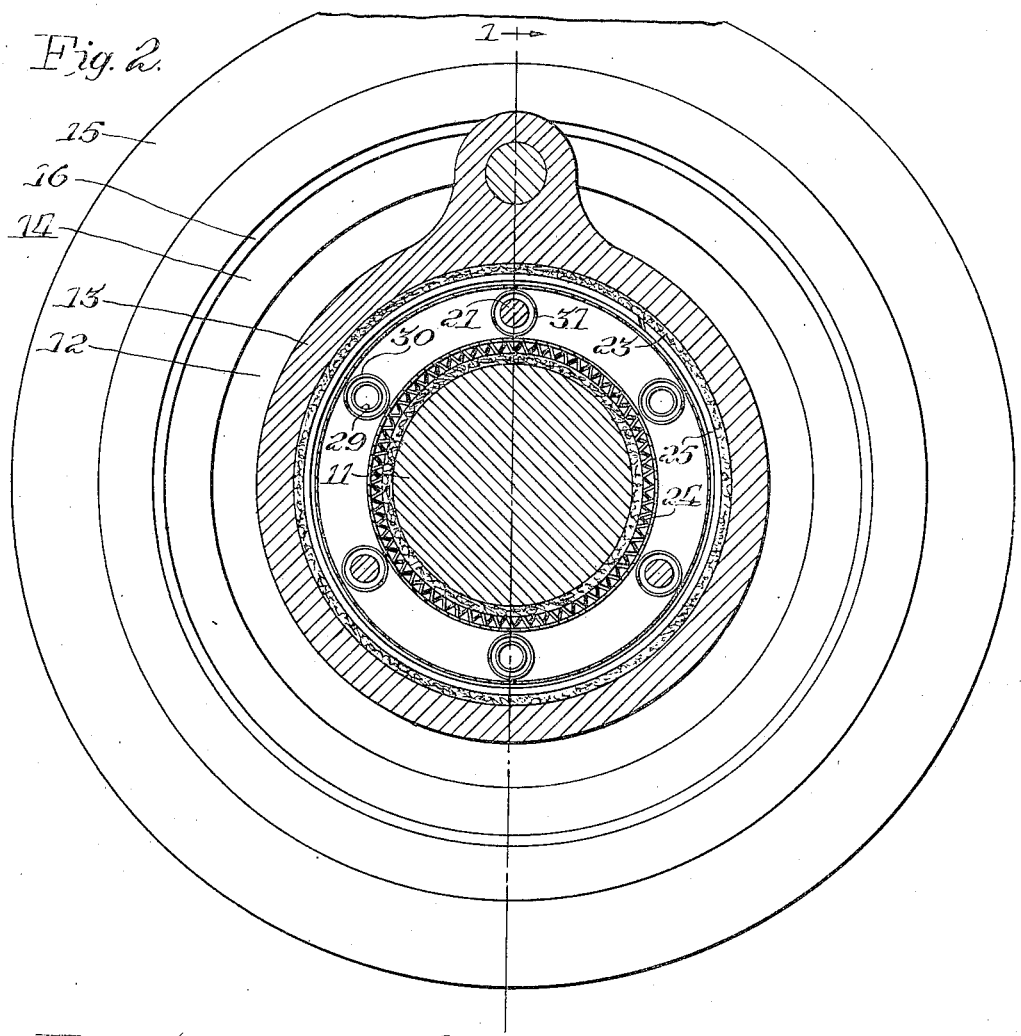
Figure 2 is a vertical cross sectional view taken along the line 2—2 of Figure 1, looking in the direction of the arrows; and, Figure 3 is a detailed cross sectional view on an enlarged scale taken along a radial line and showing a portion of the seal per se.

In the particular embodiment of the invention herein disclosed, the seal is provided for use with the track roller construction as employed in a track type tractor. Accordingly a track frame housing is shown at 10, the same carrying a transverse shaft 11 held by a bracket 12 against rotation. This bracket 12 includes a laterally inwardly extended sleeve 13. The shaft carries for rotation a carrier element 14 on which is press fitted the track roller 15, the roller and carrier being held in assembled relation against endwise lateral movement by means of a spring ring 16. The carrier 14 and roller 15 turn together as a unit around the stationary shaft 11. The face of the carrier 14 adjacent the bracket 12 is provided with an annular groove 17, into which fits the sleeve 13 of the bracket 12, thus forming an annular labyrinth passage 18 between the adjacent faces of the track roller or its carrier and the bracket 12.

It is highly important that lubricant be retained on the bearing surface between the roller and the shaft, and it is also just as important that ingress of dirt and dust to these bearing surfaces be prevented since these rollers must transmit the weight of the tractor to the ground stretch of a track. Under such severe loads dirt and dust become highly deleterious and result in breakdown and failure of the track roller.

Accordingly the seal of this invention is provided and the same will now be described in detail. First, a felt washer or packing 19 surrounds the shaft 11, said packing washer abutting the outer face of the carrier 14, as shown in Figure 1. A metal washer 20 surrounds the shaft 11 and has abutting relation with the washer 19, said washer 20 at spaced intervals carrying pins 21 extending laterally therefrom in the direction of the bracket 12, which is formed with aligned sockets 22 to receive said pins 21. By means of these pins the washer 20 is held against rotation, but it will be understood that axial movement thereof along the shaft is permitted. The heads of the pins 21 are countersunk in the washer 20 so as to present a smooth surface between the said washer 20 and the adjacent felt washer 19.

Backed against the outer face of the metal washer 20 is the bight portion of a channel or U-shaped annular sealing element or packing 23, which may be of leather or some similar material. This channel-shaped seal 23 surrounds the shaft 11 and forms a diaphragm which substantially occupies the labyrinth space 18. One leg or flange of the channel sealing element, which is its radial, inner leg, abuts the outer surface of the shaft 11, said leg of the diaphragm channel seal being resiliently pressed radially inwardly around the shaft 11 by means of a contractible coil spring 24 surrounding the shaft 11, as shown. The radially outwardly disposed leg of the diaphragm channel seal 23 is pressed radially outwardly against the inner surface of the sleeve 13 on the bracket 12 by means of an expansible ring 25, which ring 25 preferably is a split spring metal piston ring of the type commonly employed as oil rings associated with pistons employed in internal combustion engines.

Figure 3:
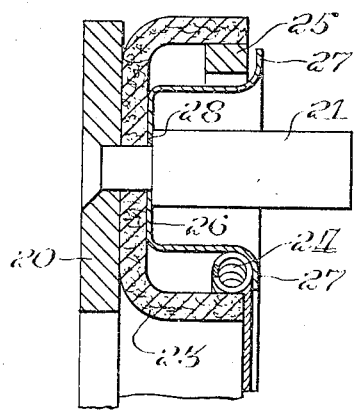

An annular channel-shaped metal retainer 26 is located within the channel of the leather diaphragm 23, said retainer having opposite flanges 27 for respectively retaining the coil spring 24 and piston ring 25 against displacement. It will be noted that the pins 21 are enlarged to provide a shoulder 28 for clamping the retainer 26 in place, said retainer 26 serving, as shown in Figure 3, to clamp the U-shaped section leather 23 to the washer plate 20. The channel retainer 26 at spaced intervals equidistantly spaced between the pins 21 is formed, as shown in Figure 3, with struckout bosses 29 to form a seat for centering compression coil springs 30. These springs are backed against the bracket 12 and perform the function of pressing the entire sealing unit in a direction coaxially of the shaft 11 toward the roller 15. Similar compression coil springs 31 surround the pins 21 and perform the same function of pressing the sealing unit coaxially toward the roller 15.

In use it can now be seen that this improved seal substantially occupies the labyrinth passage 18 between the relatively movable parts 12 and 15. The springs 30 and 31 press the unit in an axial direction toward the part 15 so that the felt washer has a tight sealing engagement with the end face of the roller carrier 14. The piston ring 25 presses the leather seal 23 radially outwardly to form a tight sealing engagement with the inner surface of the sleeve 13, and further the coil spring 24 presses the other leg of the coil spring 23 tightly around the shaft 11. There is thus provided a labyrinth seal effective in three directions providing sealing contacts to exclude dust and dirt and prevent leakage of oil. The pins 21 serve to hold the seal structure against rotation, but permit the axial movement as has been described.

It can now be seen that an improved seal structure has been provided which can easily be manufactured as practically the whole structure thereof can be produced as a unit and so assembled in the passage 18. Obviously this structure achieves the desirable objects heretofore stated.

It is the intention to cover all changes and modifications which do not depart in material respects from the illustrative example herein disclosed as indicated by the definitions of the invention comprising the appended claims.

What is claimed is:

1. A seal for use between relatively movable parts having interfitting connection with adjacent faces spaced apart to form an annular passage surrounding a shaft carrying one of the parts, said seal being arranged in said passage and comprising a washer and packing ring surrounding the shaft, an annular channel-shaped diaphragm sealing element secured to the washer, a retainer for clamping the sealing element to the washer, and separate resilient means operatively associated with the retainer and sealing element and located within the latter respectively for causing sealing engagement of the packing ring through the washer in a direction axially of the shaft and a portion of the sealing element radially inwardly around the shaft and another portion of the element radially outwardly against the inner periphery of the annular passage.

2. A seal for use between relatively movable parts having interfitting connection with adjacent faces spaced apart to form an annular passage surrounding a shaft carrying one of the parts, said seal being arranged in said passage and comprising an annular washer and packing ring surrounding the shaft, an annular channel-shaped diaphragm sealing element having its bight backed against and secured to the washer, a retainer for clamping the sealing element to the washer, and separate spring devices operatively associated with the retainer and sealing element and located within the latter respectively for causing sealing engagement of the packing ring through the washer in a direction axially of the shaft and sealing engagement of the respective flange portions of the sealing element in radially opposite directions relative to the shaft.

3. A seal for use between relatively movable parts having interfitting connection with adjacent faces spaced apart to form an annular passage surrounding a shaft carrying one of the parts, said seal being arranged in said passage and comprising an annular washer and packing ring surrounding the shaft, an annular channel-shaped diaphragm sealing element secured to the washer, said element being of U section with its flanges respectively positioned at the inner and outer diameter of the passage, an annular retainer for clamping the sealing element to the washer, said retainer being U-shaped in section and arranged within the channel of the sealing element, means operatively associated with the retainer and sealing element and located inside the channel of the retainer for causing sealing engagement of the packing ring through the washer in a direction axially of the shaft, and spring means located between the retainer and sealing element for causing sealing engagement of the respective flange portions of the element simultaneously inwardly around the shaft and radially outwardly against the inner periphery of the annular passage.

4. A seal for use between relatively movable parts having interfitting connection with adjacent faces spaced apart to form an annular passage surrounding a shaft carrying one of the parts, said seal being arranged in said passage and comprising a washer and packing ring surrounding the shaft, an annular channel-shaped diaphragm sealing element secured to the washer, a retainer located within the channel of said element for clamping the sealing element to the washer, resilient pressure means operatively associated with the retainer and sealing element for causing sealing engagement of the packing ring through the washer in a direction axially of the shaft, an annular contractible spring element held by the retainer for contracting a portion of the sealing element radially inwardly around the shaft, and an annular expansible spring element held by the retainer for expanding another portion of the element radially outwardly against the inner periphery of the annular passage, said spring elements being located within the channel of the sealing element but radially outside the retainer.

5. A seal for use between relatively movable parts having interfitting connection with adjacent faces spaced apart to form an annular passage surrounding a shaft carrying one of the parts, said seal being arranged in said passage and comprising a washer and packing ring surrounding the shaft, an annular channel-shaped diaphragm sealing element secured to the washer, said element presenting an inner diameter flange and an outer diameter flange, an annular retainer for clamping the sealing element to the washer, means operatively associated with the retainer and sealing element for causing sealing engagement of the packing ring through the washer in a direction axially of the shaft, an annular coil spring positioned by the retainer for contracting the inner diameter flange of the sealing element radially inwardly around the shaft, and an expansible spring ring positioned by the retainer for expanding the outer diameter flange of the element radially outwardly against the inner periphery of the annular passage.

6. A seal for use between relatively movable parts having interfitting connection with adjacent faces spaced apart to form an annular passage surrounding a shaft carrying one of the parts, said seal being arranged in said passage and comprising an annular washer and packing ring surrounding the shaft, an annular channel-shaped diaphragm sealing element having its bight portion backed against the washer, an annular channel-shaped retainer having its bight backed against the bight of the sealing element on its inside, pins for clamping the sealing element and retainer to the washer, springs on the pins for causing sealing engagement of the packing ring through the washer in a direction axially of the shaft, said sealing element having an inside diameter flange and an outside diameter flange, an annular coil spring held by the retainer and engaging the inside diameter flange for pressing it in sealing contact inwardly around the shaft, and a split spring ring held by the retainer and engaging the outside diameter flange for pressing it in sealing contact radially outwardly against the inner periphery of the annular passage.

7. As an article of manufacture, a self-contained seal structure comprising an annular washer, an annular diaphragm sealing element of U-section having its bight portion backed against a face of the washer, an annular retainer located inside the sealing element and likewise of U-section with its bight backed against the bight of the sealing element, pins carried by the washer and passed through the two U-section parts and including means for holding the retainer, sealing element, and washer firmly together, an annular contractible spring element held in place by the retainer and surrounding the inner diameter flange of the sealing element to contact the same, an expansible spring ring element held in place by the retainer and serving to expand radially outwardly the outer diameter flange of the sealing element, and compression springs carried on the pins for pressing the entire seal structure axially when mounted on a shaft.

8. As an article of manufacture, a self-contained seal structure comprising an annular washer, an annular diaphragm sealing element of U-section having its bight portion backed against a face of the washer, an annular retainer likewise of U-section having its bight backed against the bight of the sealing element and located within the sealing element, pins carried by the washer and passed through the two U-section parts and including means for holding the retainer, sealing element and washer firmly together, an annular coil spring held in place by the retainer and surrounding the inner diameter flange of the sealing element to contract the same, an expansible split piston ring element held in place by the retainer and serving to expand radially outwardly the outer diameter flange of the sealing element, and compression springs carried on the pins for pressing the entire seal structure axially when mounted on a shaft.

9. As an article of manufacture, a seal structure comprising an annular washer, an annular diaphragm sealing element of channel section having its bight portion backed against a face of the washer, an annular retainer backed against the bight of the sealing element and located inside its channel, pins carried by the washer and passed through the sealing element and retainer and including means for holding the retainer, sealing element and washer firmly together, an annular coil spring held in place by the retainer and surrounding the inner diameter flange of the sealing element to contract the same, an expansible spring ring held in place by the retainer and serving to expand radially outwardly the outer diameter flange of the sealing element, and compression springs carried on certain of the pins for pressing the entire seal structure axially when mounted on a shaft.

10. As an article of manufacture, a seal structure comprising an annular washer, an annular diaphragm sealing element of U-section having its bight portion backed against a face of the washer, an annular retainer likewise of U-section having its bight backed against the bight of the sealing element, pins carried by the washer in angularly spaced relation and passed through the two U-section parts and including means for holding the retainer, sealing element and washer firmly together, an annular coil spring held in place by the retainer and surrounding the inner diameter flange of the sealing element to contract the same, an expansible piston ring held in place by the retainer and serving to expand radially outwardly the outer diameter flange of the sealing element, compression springs carried on the pins for pressing the entire seal structure axially when mounted on a shaft, and bosses on the retainer in angularly spaced relation and alternating with the pins, said bosses serving as seats for mounting additional springs to press the seal structure axially.

11. As an article of manufacture, a seal structure comprising an annular washer, an annular diaphragm sealing element of U-section having its bight portion backed against a face of the washer, an annular retainer likewise of U-section located within the sealing element and having its bight backed against the bight of the sealing element, pins carried by the washer and passed through the two U-section parts and including means for holding the retainer, sealing element and washer firmly together, said retainer having a flange, an annular coil spring held in place by the said flange on the retainer and surrounding the inner diameter flange of the sealing element to contract the same, a second flange on the retainer, an expansible ring held in place by the second flange on the retainer and serving to expand radially outwardly the outer diameter flange of the sealing element, and compression springs carried on certain of the pins for pressing the entire seal structure axially when mounted on a shaft.

12. As an article of manufacture, a seal structure comprising an annular washer, a channel section packing arranged with its back against said washer and having inner and outer diameter flanges extending away from said washer, an annular channel section retainer located within the channel of the packing and also having inner and outer diameter flanges, an expansible annular spring element located between the outer diameter flanges of the packing and retainer to press the outer diameter flange of the packing radially outwardly, and an annular contractible spring element located between the inner diameter flange of the packing and retainer to press the inner diameter flange of the packing radially inwardly.

NORMAN O. PANZEGRAU.